United States Patent [19]

Fero et al.

[11] Patent Number: 4,844,858
[45] Date of Patent: * Jul. 4, 1989

[54] REACTOR CAVITY DOSIMETRY SYSTEM AND METHOD

[75] Inventors: Arnold H. Fero, New Kensington; Stanwood L. Anderson, Jr., Plum Borough; James Sejvar, Murrysville Boro, all of Pa.

[73] Assignee: Westinghouse Electric Corp., Pittsburgh, Pa.

[*] Notice: The portion of the term of this patent subsequent to Jun. 27, 2006 has been disclaimed.

[21] Appl. No.: 32,864

[22] Filed: Mar. 31, 1987

[51] Int. Cl.$^4$ ............................................. G21C 17/00
[52] U.S. Cl. .................................................. 376/254
[58] Field of Search ............... 376/254, 255, 249, 154, 376/155

[56] References Cited

U.S. PATENT DOCUMENTS

| | | | |
|---|---|---|---|
| 3,073,959 | 1/1963 | Jervis | 376/254 |
| 3,089,958 | 5/1963 | Janner | 250/83.1 |
| 3,809,940 | 5/1974 | Sekella | 313/61 R |
| 3,971,944 | 7/1976 | Quinby | 250/391 |
| 4,044,301 | 8/1977 | Allain et al. | 376/255 |
| 4,069,097 | 1/1978 | Frank . | |
| 4,079,236 | 3/1978 | Graham et al. | 364/504 |
| 4,097,330 | 6/1978 | Neissel et al. . | |
| 4,157,277 | 6/1979 | Marmonier et al. . | |
| 4,186,048 | 1/1980 | Thomas . | |
| 4,200,491 | 4/1980 | Ball . | |
| 4,288,291 | 9/1981 | Cisco et al. . | |
| 4,318,776 | 3/1982 | Proll et al. | 376/254 |
| 4,404,164 | 9/1983 | Kopp et al. | 376/154 |
| 4,429,329 | 1/1984 | Clemens et al. | 376/249 |
| 4,504,437 | 3/1985 | Underwood et al. | 376/153 |
| 4,578,237 | 3/1986 | Mordarski et al. | 376/154 |
| 4,639,349 | 1/1987 | Baratta et al. | 376/254 |
| 4,728,482 | 3/1988 | Boyle et al. | 376/249 |
| 4,729,866 | 3/1988 | Ruddy et al. | 376/153 |
| 4,744,938 | 5/1988 | Ruddy | 376/153 |

FOREIGN PATENT DOCUMENTS

| | | | |
|---|---|---|---|
| 0612001 | 1/1961 | Canada | 376/265 |
| 2516938 | 10/1976 | Fed. Rep. of Germany | 376/249 |
| 2709023 | 9/1978 | Fed. Rep. of Germany | 376/249 |
| 2834108 | 12/1979 | Fed. Rep. of Germany | 376/249 |
| 5115798 | 7/1974 | Japan . | |
| 54-103990 | 8/1979 | Japan . | |
| 59-102193 | 6/1982 | Japan . | |
| 59-203997 | 6/1983 | Japan . | |
| 0947104 | 1/1964 | United Kingdom | 376/254 |

Primary Examiner—Stephen C. Bentley
Assistant Examiner—Daniel Wasil

[57] ABSTRACT

A reactor cavity dosimetry system and method in a nuclear power plant having a reactor vessel and a primary biological shield substantially surrounding the reactor vessel thereby forming a reactor cavity between the vessel and the shield, the system and method providing for remotely and repeatedly positioning a plurality of neutron dosimeters at preselected locations within the cavity, and for withdrawing the dosimeters for analysis thereof and replacing them at the same preselected positions. Assessment of the long-term effects of neutron irradiation on the vessel is enhanced by accurate and repetitive placement of the dosimeters.

50 Claims, 8 Drawing Sheets

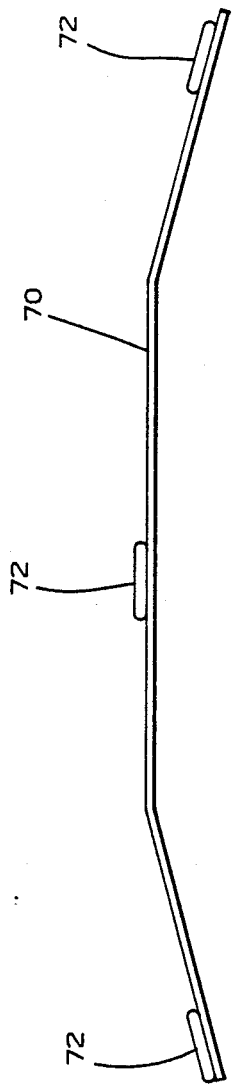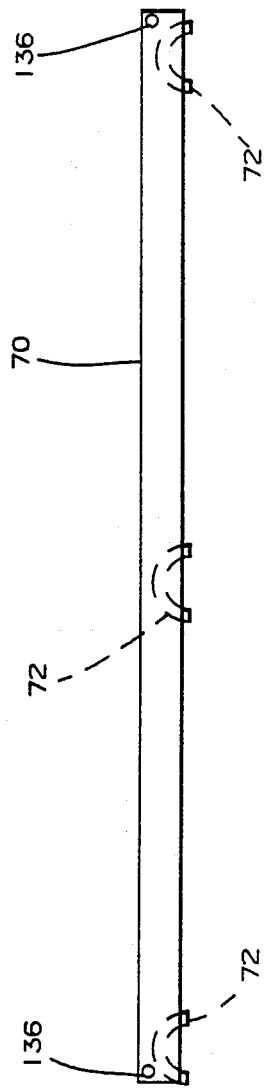

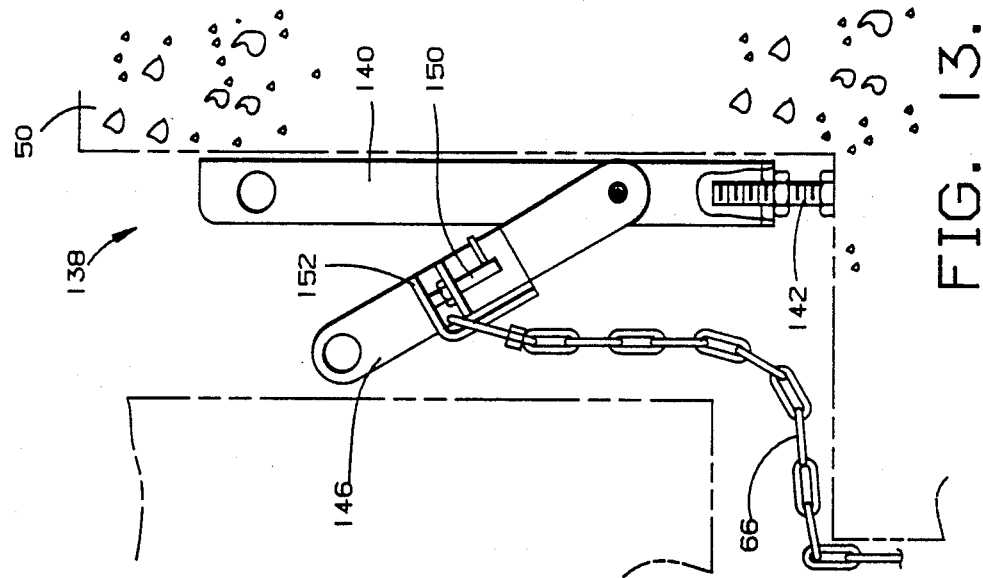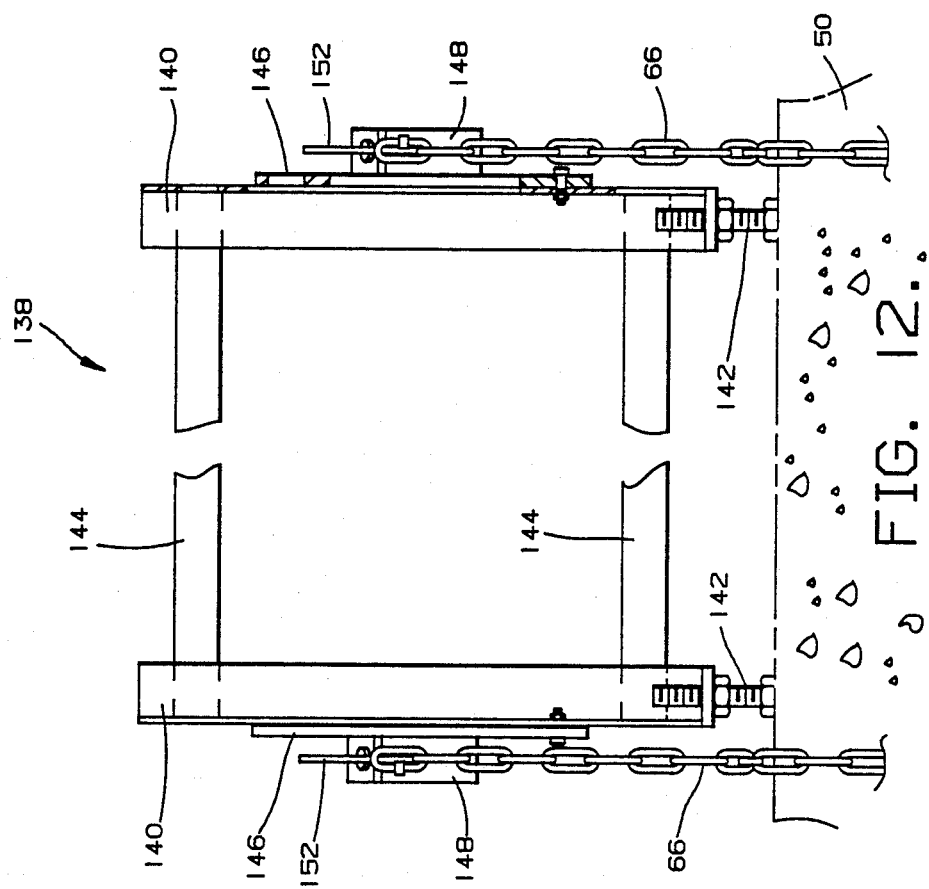

REACTOR CAVITY DOSIMETRY SYSTEM AND METHOD

BACKGROUND OF THE INVENTION

This invention relates generally to methods and apparatus for monitoring nuclear reactors, and more particularly to such methods and apparatus that employ parameters which are monitored exterior of the reactor core.

Conventional pressurized water reactors typically contain a reactive region and commonly referred to as the core, in which sustained fission reactions occur to generate heat. The core includes a plurality of elongated fuel rods comprising fissile material, positioned in assemblies and arranged in a prescribed geometry governed by the physics of the nuclear reaction. Neutrons bombarding the fissile material promote the fissionable reaction which, in turn, releases additional neutrons to maintain a sustained process. The heat generated in the core is carried away by a cooling medium which circulates among the fuel assemblies, and is conveyed to heat exchangers which in turn produce steam for the generation of electricity.

A neutron absorbing element is also included within the cooling medium in controlled variable concentrations to modify the reactivity, and thus the heat generated within the core as required. In addition, control rods are interspersed among the fuel assemblies, longitudinally movable axially within the core, to control the core's reactivity and thus its power output. There are three general types of control rods that are typically employed for various purposes. Full length rods, which extend in length to at least the axial height of the core, are normally employed for reactivity control. Part length control rods, which have an axial length substantially less than the height of the core, are normally used for axial power distribution control. In addition, reactor shut-down control rods are provided for ceasing the sustained fissionable reaction with the core and shutting down the reactor. Both part length and full length control rods are arranged to be incrementally movable into and out of the core to obtain the degree of control desired.

While the radial power distribution of the core is fairly predictable, due to the prescribed arrangement of fuel assemblies and the positioning of control rods which are symmetrically situated radially throughout the core, the axial power distribution can vary greatly during reactor operation. Core axial power distribution has created many problems throughout the history of reactor operation for many reasons. Normally, coolant flow through the fuel assemblies is directed from a lower portion of the core to the upper core regions, resulting in a temperature gradient axially along the core. Changes in the rate of the fissionable reaction, which is temperature dependent will thus vary the axial power distribution. Secondly, the axial variation in the power distribution varies the xenon axial distribution, which further accentuates the variations in power axially along the core. This can lead to a xenon-induced axial power distribution oscillation which can, late in core life, be unstable without corrective operator intervention. Thirdly, insertion of the control rods from the top of the core, without proper consideration of the past operating history of the reactor, can worsen the axial power peaking.

Power distribution monitoring is typically conducted within conventional nuclear power plants through in-core instrumentation systems as well as ex-core instrumentations. In-core instrumentation systems are generally comprised of movable miniature fission chambers which are designed to yield information pertaining to neutron flux distribution at selected locations in the reactor core, fuel assembly outlet thermocouples, and in some cases fixed miniature fission chambers. Such systems provide an accurate measure of the core relative power distribution, but provide no automatic protective function for the reactor. On the other hand, ex-core instrumentation systems are typically comprised of uncompensated, long ion chambers or power range detectors which are located in four vertical instrument wells outside the reactor vessel and symmetrically placed with respect to the core. Such power range detectors are calibrated to the in-core system and are used to provide automatic reactor protection against adverse power peaking. As noted above, protection against axial power peaking which may arise due to divergent axial xenon oscillations and transient axial xenon redistribution are a prime interest, especially in those nuclear power plants which employ larger cores.

Over the lifetime of a nclear power plant, changing fuel management schemes can result in significant changes in both the magnitude and distribution of neutron flux and, hence, neutron fluence throughout the reactor vessel beltline region. In order to accurately access the long-term effects of neutron irradiation on the properties of reactor vessel materials, such changes in radiation level must be well known.

Operating reactors often utilize a reactor vessel surveillance program which consists of from six to eight surveillance capsules located between the core and the reactor vessel in the downcomer region near the reactor vessel wall. Neutron dosimeters contained in such surveillance capsules provide measurement capability at a single location within the reactor geometry. Nevertheless, by themselves they cannot provide the gradient information that is required to evaluate the impact of fuel management schemes, such as the incorporation of low leakage loading pattern, which may result in radical changes in neutron flux distributions from cycle to cycle. Additional information, however, can be obtained by the use of supplementary passive neutron dosimeters installed in the reactor cavity annulus between the reactor vessel wall and the primary shield.

Prior art approaches which have utilized such supplementary passive neutron dosimeters have typically hung the dosimeters by stainless steel, nickel, or iron wires at various locations within the reactor cavity. Accurate placement of the dosimeters, however, was difficult at best since in most nuclear power plants the cavity between the reactor vessel and the primary biological shield is narrow and often largely inaccessible. Furthermore, during the operations of such nuclear power plants, expansion and contraction of the reactor vessel upon heat-up and cool-down, as well as heavy ventilating air currents which pass over the dosimeters, have a potentially adverse impact on the accuracy and repeatability of dosimeter placement. Mechanical vibrations exist as well. It is, therefore, readily apparent that a method and apparatus for accurately and repetitively placing supplementary passive neutron dosimeters within the reactor cavity would be desirable.

Commercial operators of nuclear power plants are also reluctant to employ such prior art approaches for the placement of supplementary passive neutron dosimeters due to the interference they create with refueling operations. During a typical refueling operation (i.e., the replacement of a reactor's fuel assemblies upon the exhaustion of their fuel) the head assembly of the reactor vessel must be removed in order to withdraw the spent fuel assemblies. However, in order to provide shielding of potentially dangerous radiation during refueling, the reactor cavity is sealed off in order that the space above the reactor vessel may be flooded with water. This is a accomplished most often in one of two ways. A first approach merely clamps a heavy steel plate over the reactor cavity, with the steel plate including gaskets on either side of the cavity. The second approach utilizes the steel plate of the first approach, but additionally employs an inflatable bladder which serves to further seal the reactor cavity at a top portion thereof. As can be appreciated, any reactor cavity dosimetry system which is to be used in such nuclear power plants must avoid the possibility of interfering with the sealing properties of the steel plate and/or bladder, as well as to prevent punctures to the inflated bladder which could lead to breakage of the seal.

In addition to the access problems presented by varying reactor cavity configurations, problematic placement of a reactor cavity dosimetry system is further aggravated by the necessity of protective clothing for those personnel changing the dosimeters. As is conventional, in order to work about a deactivated reactor, personnel must wear many layers of protective clothing and a full-face respirator which can lead to heat prostration under long periods of use. It would, therefore, be desirable in the design of a reactor cavity dosimetry system to provide one which is capable of rapid and remote deployment.

SUMMARY OF THE INVENTION

Accordingly, it is a general object of the present invention to provide a method and apparatus for monitoring neutron exposure to a reactor vessel. More specifically, it is an object of the present invention to provide a reactor cavity dosimetry system which is capable of accurate and repetitive placement of the dosimeters at a plurality of preselected locations within the reactor cavity.

Another object of the present invention is to provide a reactor cavity dosimetry system and method which does not interfere with refueling operation of the reactor.

Still another object of the present invention is to provide a reactor cavity dosimetry system and method which is capable of rapid placement of the dosimeters from a remote location in order to minimize exposure of personnel operating such systems to high radiation levels.

Briefly, these and other objects of the present invention are provided in a nuclear power plant having a reactor vessel including a wall and a seal ledge, a core contained within the reactor vessel which includes an array of neutron-producing fuel elements adapted for cyclical replacement upon exhaustion of the fuel, and a primary biological shield substantially surrounding the reactor vessel thereby forming a reactor cavity between the wall and the shield, by a system and method for monitoring neutron exposure to the reactor vessel. The system comprises generally a means for indicating a neutron dosage accumulated over the fuel cycle, and a means for remotely positioning the indicating means at a plurality of preselected locations within the cavity.

On the other hand, the method according to the present invention includes the steps of forming a plurality of neutron sensor sets adapted to indicate a neutron dosage accumulated over the fuel cycle, remotely positioning the sensor sets at a plurality of preselected locations within the cavity, exposing the remotely positioned sensor sets by operating the plant, retrieving, upon cessation of plant operations, the exposed sensor sets remotely from the reactor sump conducting neutron activation analysis of the exposed sensor sets, and repeating the above described steps from fuel cycle to fuel cycle in order to provide a mechanism for the long-term monitoring of the neutron exposure of those portions of the reactor vessel and vessel support structure which may experience radiation-induced increases in reference nil ductility transition temperature over the lifetime of the nuclear power plant. When used in conjunction with dosimetry from conventional internal surveillance capsules and with the results of neutron transport calculations, the reactor cavity dosimetry system according to the present invention allows the projection of embrittlement gradients throughout the reactor vessel wall with a minimum uncertainty. Minimizing the uncertainty in the neutron exposure projections will, in turn, help to assure that the reactor can be operated in the least restrictive mode possible with respect to: (1) pressure/temperature limit curves for normal heat-up and cooldown of the reactor coolant system, emergency response guideline pressure/temperature limit curves, and pressurized thermal shock reference nil ductility transition temperature screening criteria. In addition, an accurate measure of the neutron exposure of the reactor vessel and support structure can provide a sound basis for requalification should operation of the plant beyond the current design and/or licensed lifetime proved to be desirable.

The above and other objects, advantages, and novel features of the present invention will become more apparent from the following detailed description when considered in conjunction with the accompanying drawings:

BRIEF DESCRIPTION OF THE DRAWINGS

FIGS. 9 and 10 respectively show top and side views of a support plate according to one embodiment of the present invention;

FIGS. 12 and 13 respectively show front and side views of a support stand according to a second embodiment of the present invention.

DETAILED DESCRIPTION OF THE INVENTION

Figure 1:
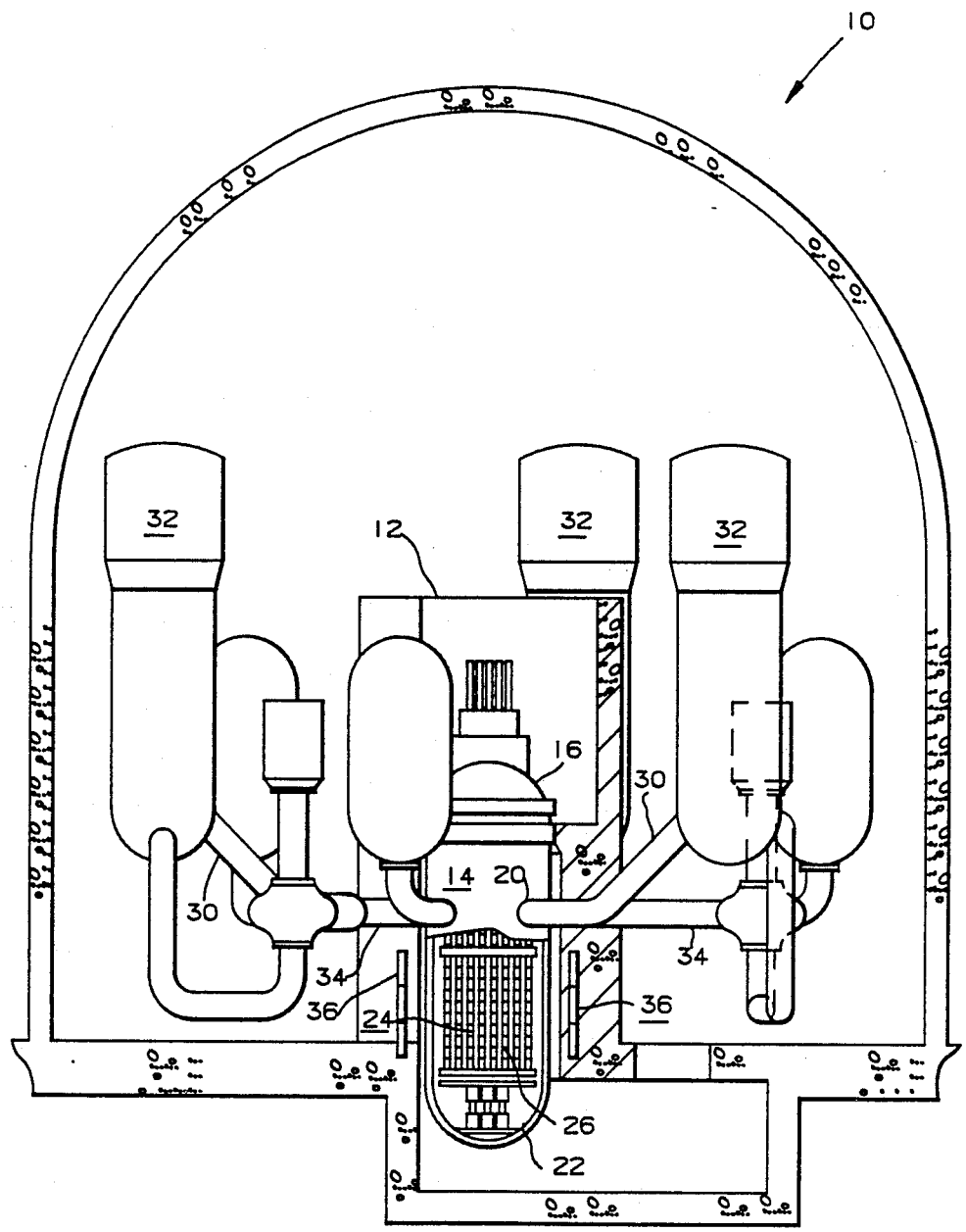
FIG. 1 is a diagrammatic view of a typical nuclear power plant.

Referring now the drawings, wherein like characters designate like or corresponding parts throughout the several views, there is shown in FIG. 1 a diagrammatic representation of a typical nuclear power plant 10 having a pressurized water reactor 12 which can employ the method and apparatus of this invention in order to more accurately assess the long-term effects of neutron irradiation on the properties of the reactor vessel materials. The reactor 12 of FIG. 1 includes a reactor vessel 14 which forms a pressurized container when sealed by its head assembly 16. The reactor vessel has coolant flow inlet means 18 (see FIG. 2) and coolant flow outlet means 20, otherwise known as nozzles, formed integral with and through its cylindrical wall 22. As is known in the art, the vessel 14 contains a nuclear core 24 of the type previously described and more fully illustrated schematically in FIG. 2, consisting mainly of a plurality of clad nuclear fuel elements 26 arranged in assemblies 28 which generate substantial amounts of heat, depending primarily upon the position of the part length and full length control rods, previously described. The heat generated by the reactor core 24 is conveyed from the core by coolant flow entering through the inlet means 18 and exiting through the outlet means 20. Generally, the flow exiting through the outlet means 20 is conveyed through an outlet conduit 30 to a heat exchange steam generator system 32, wherein the heated flow is conveyed through tubes which are in heat exchange relationship with water which is utilized to produce steam. The steam produced by the generator is commonly utilized to drive a turbine for the production of electricity. Subsequently, the flow of coolant is conveyed from the steam generator 32 through a cool leg conduit 34 to the inlet means 18. A closed recycling primary or steam generating loop is thus provided with coolant piping coupling the reactor vessel 14 and the steam generators 32. As is apparent, the reactor vessel 14 illustrated in FIG. 1 is adaptable for three such closed fluid flow systems or loops, although it should be understood that the number of such loops varies from plant to plant and commonly 2, 3, or 4 are employed.

In the production of thermal power within the core, important parameters affecting the axial power distribution, as previously explained, are the level of control rod insertion of both the full length and part length rods, as well as the burn-up history of the core, the power level of the reactor, and the xenon distribution. Without constant surveillance of the axial power distribution throughout the axial height of the core, it would be imperative to monitor and have full knowledge of the past history of each of the above parameters in order to establish a substantially flat axial flux distribution to achieve a load follow capability. These important parameters can be measured from information obtained from the control rod position indication system described in U.S. Pat. No. 3,858,191, issued Dec. 31, 1974, the in-core thermocouples, the resistance temperature detectors within the coolant piping, and from ex-core neutron detectors 36 as illustrated in FIG. 1.

Figure 2:
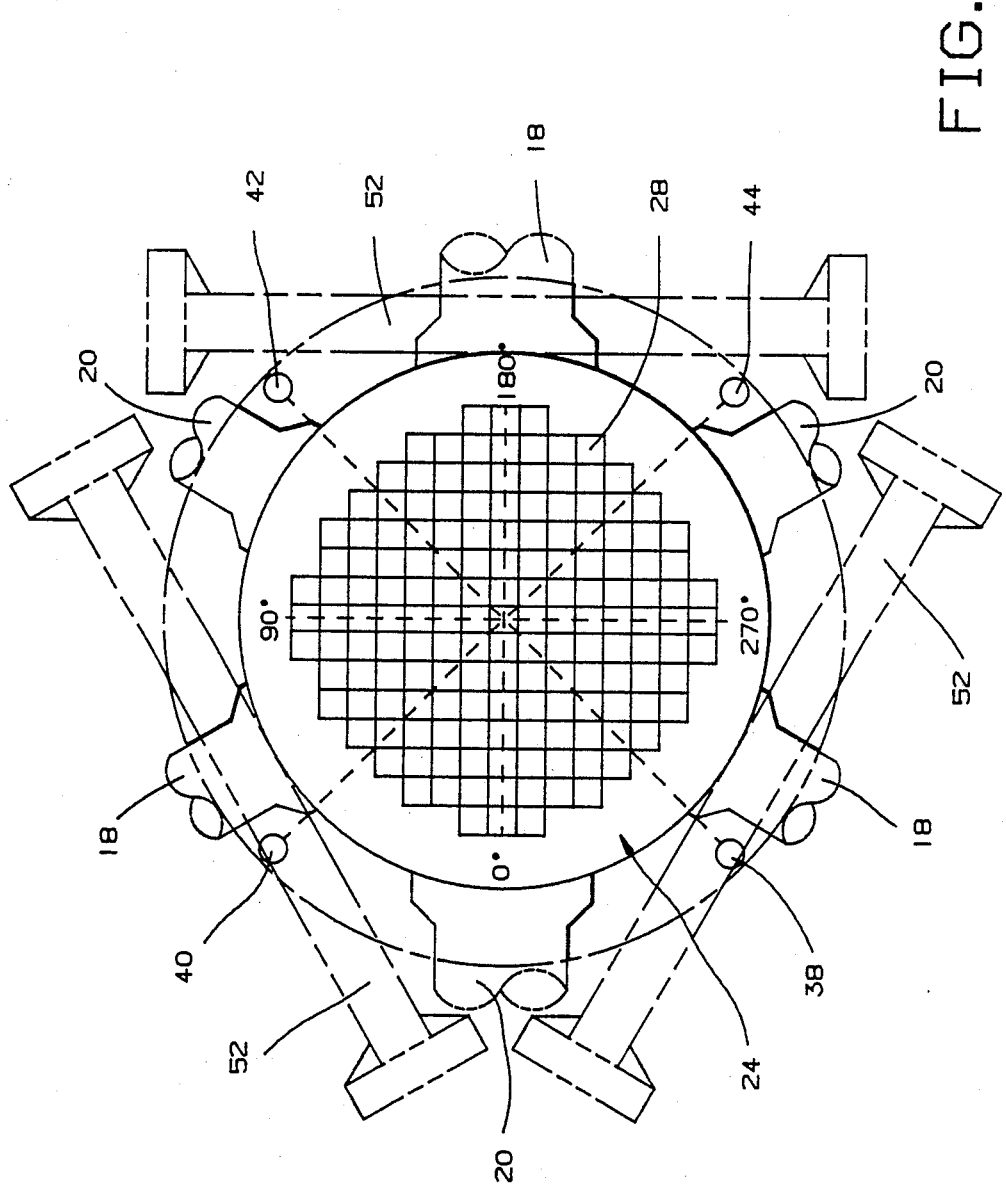
FIG. 2 is a schematic view of the nuclear reactor shown in FIG. 1 illustrating the relative positioning of the fuel assemblies, control rods and excore detectors.

As shown in FIG. 2, the ex-core neutron detectors 38, 40 42, 44 are divided along the axial height of the core 24 to provide independently responsive flux sensitive areas proximate to sections of the core 24. The difference in outputs between the detector sections normalized to the relative power of the core provides a measure of the axial offset normally employed to maintain a relative balance between the flux distribution within the portions of the core as previously explained. Further details may be had with reference to U.S. Pat. No. 4,079,236, issued Mar. 14, 1978, assigned to the assignee of the present invention and incorporated herein by reference.

Also shown in FIG. 2 is a schematic representation of the core 24. The core locations 28 generally refer to fuel assembly positions. It can thus be appreciated that the reactor core 18 is designed to be symmetrical about its central axis. During powered operation, the axial power distribution in the core 24 is monitored at a plurality of ex-core detector locations 38, 40, 42 and 44, symmetrically positioned around the periphery of the reactor 22. Each detector 36 at the locations 38, 40, 42 and 44 provides corresponding flux information in an adjacent quadrant of the core 24.

Analytical studies have shown that, while changes in core power distribution can cause significant variations in the magnitude and spatial distribution of the neutron flux in the reactor cavity from fuel cycle to fuel cycle, the energy distribution of neutrons is controlled primarily by the reactor internal arrangement and the reactor cavity geometry and is usually quite insensitive to changing fuel management schemes. However, the use of high burn-up fuel in low leakage fuel loading patterns tends to harden the leakage spectrum due to the larger fraction of plutonium fissions in those assemblies. A number of measuring instruments are employed to promote safety and to permit proper control of the nuclear reaction. Among other measurements, a neutron flux map is generated periodically, such as every 28 days, using data gathered by neutron flux detectors which are moved through a number of selected fuel assemblies. In order to guide flux detectors within the fuel assemblies, closed stainless steel tubes known as flux thimbles extend through the bottom of the reactor vessel and into the fuel assemblies which have been selected as measuring sites. While the details of the detectors and their respective drive units are not illustrated herein, the operation of the detectors and the operation and processing information are described and illustrated in the above-mentioned U.S. Pat. No. 3,858,191, while details of the method employed to monitor neutron flux in a nuclear reactor are described in U.S. Pat. Nos. 3,932,211, and 4,255,234, each of which is assigned to the assignee of the present invention, and is incorporated herein by reference.

Figure 3:
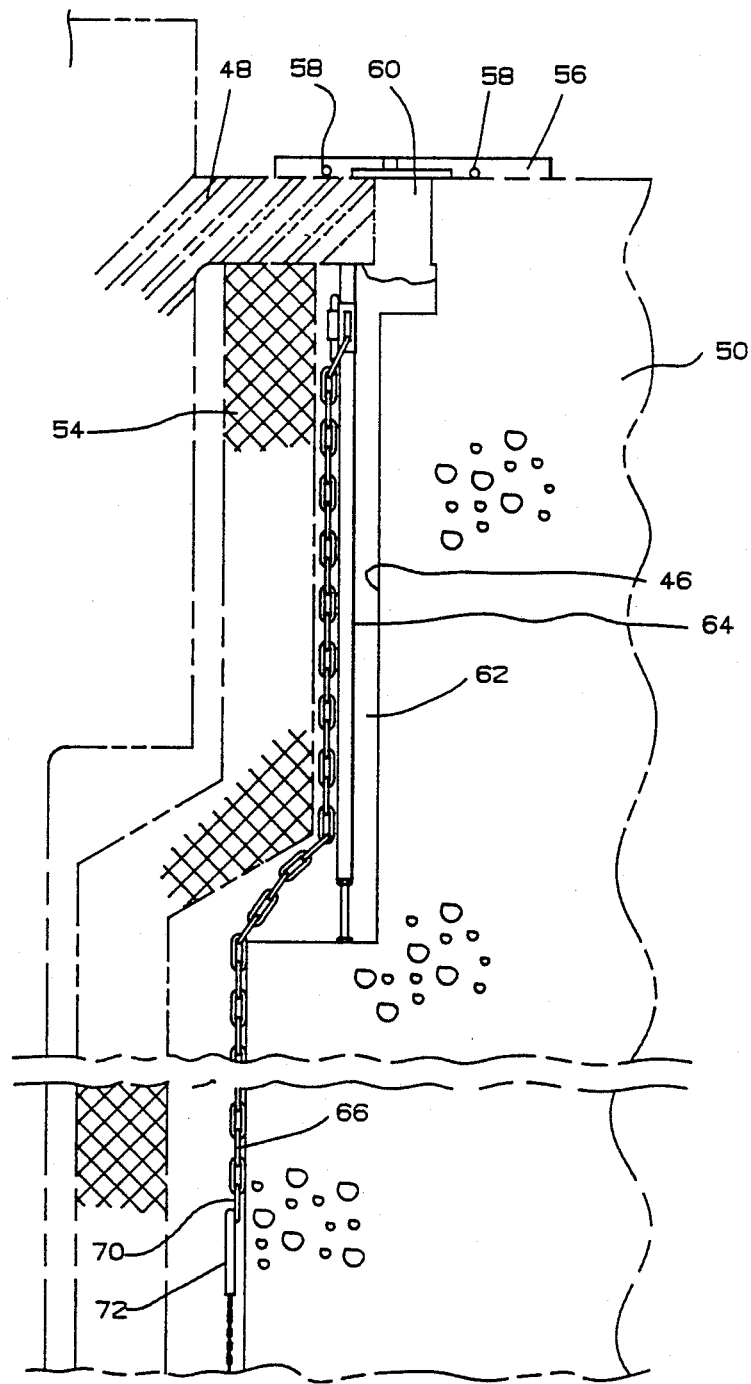
FIG. 3 is a detailed view, partly in section, of the reactor cavity shown in FIG. 1, illustrating one embodiment of the present invention.

Additional information, however, can be obtained by the use of supplementary passive neutron dosimeters installed in the reactor cavity annulus between the reactor vessel wall and the primary shield. Referring now to FIG. 3, a detailed view of the reactor cavity 46 is shown. As is apparent, the cavity 46 is formed between the wall 22 of the reactor vessel 14, which further includes a seal ledge 48, and the concrete primary biological shield 50. Access to the cavity 46 is impeded not only by its narrow and tortuous dimensions, which are often only two to four inches wide, but also by the nozzles 18 and 20 as well as the reactor vessel supports 52 shown in FIG. 2. Also contained within the cavity 46 is a layer of insulation 54 which minimizes heat transfer from the reactor vessel 14.

Besides the problem of access, another problem experienced in prior art reactor cavity dosimetry systems which merely hung the dosimeters on stainless steel, nickel, or iron wires, was the interference with conventional sealing systems used during refueling operations. As shown in FIG. 3, a typical sealing system is comprised of a cover plate 56 having gaskets 58 formed to seal the cavity 46. Other such systems additionally employed an inflatable bladder 60 which, when deployed, partially fill the cavity 46 between the seal ledge 58 and the primary biological shield 50. Any puncture hazards would, therefore, be desirably removed.

Figure 4:
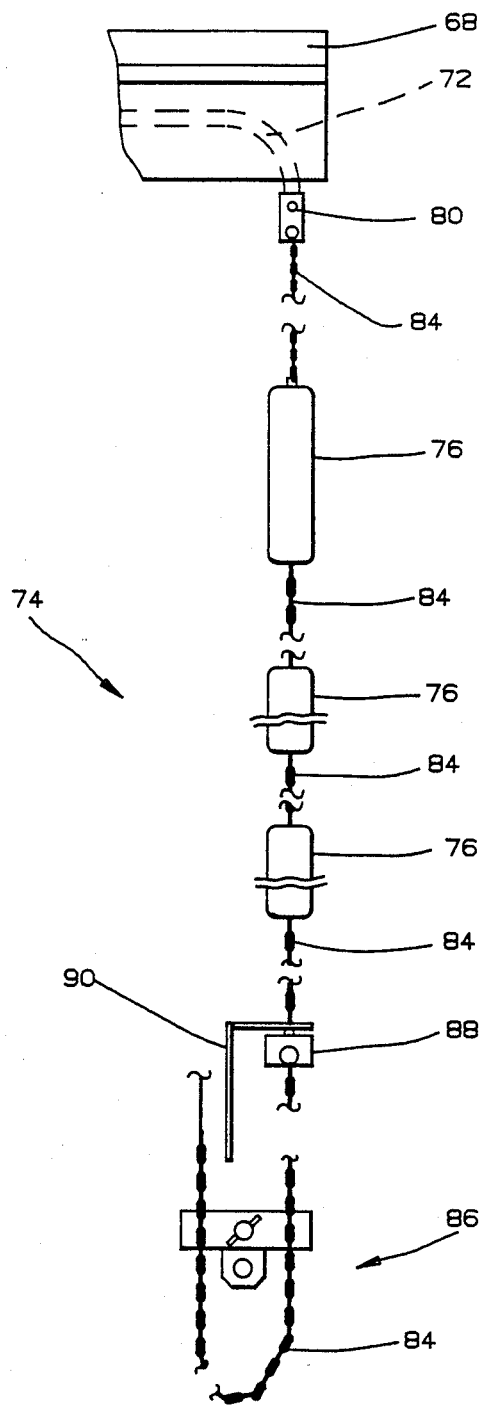
FIG. 4 illustrates a sensor set used with the reactor dosimetry system according to the present invention.

In order to overcome such problem, and to accurately and repetitively position supplementary passive neutron dosimeters in the reactor cavity 46, a reactor cavity dosimetry system 62 according to one embodiment of the present invention is shown in FIG. 3. The system 62 is comprised generally of a collapsible support stand 64, at least one chain 66 connected to the support stand 64 and supporting a means for locating a plurality of dosimeters at predetermined heights relative to the reactor vessel 14. The locating means generally comprises one or more bars 70, each of which are suspended within the cavity 46 at a respective predetermined height. A tube 72 is attached to each of the bars 70 for guiding a means for transferring the dosimeters between the preselected locations and a change-out location such as beneath the reactor vessel 14.

Where a sufficient access room for installation is available, a plate 68, as seen in FIG. 4, may be affixed to the insulation 54 within the cavity 46, in place of a support bar 70, as is further described in detail below with reference to FIGS. 9 and 10.

In either case, the plates 68 or support bars 70 have mounted thereon a generally U-shaped tube 72 which comprises the guiding means. The U-shaped tube 72 is conveniently affixed to a plate 68 or support bar 70 by extending each leg of the tube 72 downwardly through and attaching it to a respective one of holes formed in a pair of brackets (not shown) attached to the plate 68 or support bar 70.

Figure 5:
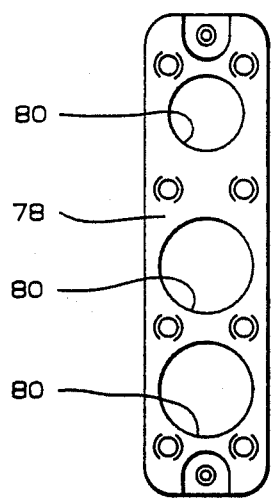
FIGS. 5 and 6 respectively show the front and sectional view of a dosimetry holder according to the present invention.
Figure 6:
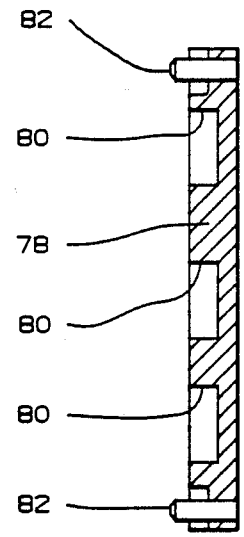

A means for indicating the neutron dosage accumulated over the fuel cycle, according to the embodiment of the present invention as shown in FIG. 4, includes a plurality of neutron sensor sets 74 which are guided from the remote location to the preselected locations within the cavity 46 by the U-shaped tube 72. Each sensor set 74 is comprised generally of at least one dosimeter 76, and means for housing the dosimeter. Referring now to FIGS. 5 and 6, the housing means includes a holder plate 78 having formed therein a plurality of cavities 80, each of which is adapted to contain at least one dosimeter 76, a lid plate (not shown) covering the holder plate 78 with at least one dosimeter 76 contained therein, and means for securing the lid plate to the holder plate 78, such as screws. Each holder plate 78, in a presently preferred embodiment of the invention, includes three cavities 80 to hold the neutron sensors. The top cavity 80 as shown in FIGS. 5 and 6, is smaller than the lower two cavities 80 since it is intended to accommodate bare sensors, whereas the lower cavities 80 are meant to house cadmium-shielded sensors. The separation between the top cavity 80 and the next lower cavity 80 is such that cadmium shields inserted into the next lower cavity 80 do not introduce perturbation in the thermal flux of the sensor contained in the top cavity 80. The holder plate 78 may further comprise a pair of registration pins 82 in order to attach and capture the bead chains (84, FIG. 4) via a bead chain fitting which fits over the pins 82 and to securely place the cover plate (not shown).

The sensor sets 74 of the present invention consist of two general types: radiometric monitors and solid state track recorders (SSTR). The radiometric monitors utilized in accordance with the present invention include cadmium-shielded foils or wires of metals selected from the group consisting of iron, nickel, copper, niobium, titanium, silver, and cobalt-aluminum. Bare iron, silver, and cobalt monitors may also be employed. The SSTR consists of reusable deposits of fissionable material on high purity nickel backing disks in surface contact with replaceable mica. As is known, neutron-induced fission in isotopes of uranium, plutonium, and neptunium produces latent fission-fragment tracks in the SSTR. Such tracks are developed by chemical etching to a size that is observable to an optical microscope for track counting. Both bare and cadmium-shielded isotopes of U-235 and Pu-239 may be used, as well as cadmium-shielded U-238 and Np-239. Referring again to FIG. 4, each dosimeter 76 containing the radiometric monitors and SSTR is connected by stainless steel, beaded gradient chains 84. Coupled with chemical analysis, these segmented chains 84 provide iron, nickel, and cobalt reaction which are used to complete the determination of the axial and azimuthal gradients. Table I below illustrates the measured neutron reactions from such dosimeters 74.

TABLE I

MEASURED NEUTRON REACTIONS

| Material | Reaction of Interest | Neutron Energy Response(1) | Product Half-Life | Gradien Chain(2) |
|---|---|---|---|---|
| Copper | $^{63}Cu(n,)^{60}Co$ | 6.13–11 MeV | 5.272 yr | No |
| Niobium | $^{93}Nb(n,n^1)^{93m}Nb$ | 0.67–5.7 MeV | 13.6 yr | No |
| Titanium | $^{46}Ti(n,P)^{46}Sc$ | 3.86–9.4 MeV | 83.8 dy | No |
| Iron | $^{54}Fe(n,P)^{46}Mn$ | 2.47–7.8 MeV | 312.2 dy | Yes |
|  | $^{58}Fe(n,\gamma)^{59}Fe$ | Thermal | 44,51 dy | Yes |
| Nickel | $^{58}Ni(n,P)^{58}Co$ | 2.09–7.6 MeV | 70.91 dy | Yes |
| Cobalt-Aluminum | $^{59}Co(n,\gamma)^{60}Co$ | Thermal | 5.272 yr | Yes |
| Silver | $^{109}Ag(n,\gamma)^{110m}$ | Thermal | 249.8 dy | No |
| $^{235}U$ SSTR | $^{235}U(n,f)$ | Thermal | Stable | No |
| $^{238}U$ SSTR | $^{238}U(n,f)$ | 1.51–6.7 MeV | Stable | No |
| $^{237}Np$ SSTR | $^{237}Np(n,f)$ | 0.67–5.7 MeV | Stable | No |
| $^{239}Pu$ SSTR | $^{239}Pu(n,f)$ | Thermal | Stable | No |

(1)Energies between which 90% of activity of produced ($^{235}U$ fission spectrum)

In choosing sensor set locations for the reactor cavity dosimetry system according to the present invention, advantage may be taken of the octant symmetry typical of pressurized water reactors. That is, measurements may be concentrated to obtain azimuthal flux distributions in a single 45° sector with axial distributions determined over the entire active fuel height. Placement of the discrete sensor sets is such that spectrum determinations are made at various locations on the midplane of the active core 24 to measure spectrum changes caused by varying amounts of water located between the core 24 and the reactor vessel 14. These thickness changes are due to the conventional stair step shape of the reactor core periphery relative to the cylindrical geometry of the reactor internals and reactor vessel. Remaining sensor sets are positioned opposite the top and bottom of the active core 24 or opposite key circumferential reactor vessel welds at particular azimuthal angles of interest. The intent here is to measure axial variations in neutron spectrum over the core height, particularly near the top of the fuel where back scattering of neutrons from primary nozzles 18 and 20 and reactor vessel support structures 52 can produce significant differences. At each of the azimuthal locations selected for spectrum measurements, stainless steel gradient chain 84 may be extended over the full height of the active fuel.

Referring again to FIG. 4, the means and method by which the dosimeters are accurately placed relative to the vessel are illustrated. The beaded loop of chain 84 carries the dosimeters 76, and is movable through the U-tube 72. The operator, e.g., standing on the floor below the bottom 22 of the vessel, can release the chain clamp 86 and rotate the entire chain. An end stop 88 carried by the chain is designed to abut against tube 72, i.e. it cannot be carried through the tube and thus fixes the counterclockwise movement of the chain as seen in FIG. 4. When the chain is thus moved so that stop 88 is carried up to the U-tube, the operator claims chain 84 to chain clamp 86, which is fixed in position, e.g., to the sump floor in the area below the bottom of the vessel, as seen in FIG. 1, to hold the chain in a precise position. When this is done, the dosimeter sensor 74 is fixed relative to the vessel, such that each dosimeter 76 is at a predetermined location. The entire sensor section 74 is releasably connected between the upper and lower stop elements 88 by a pin at each such element. Thus, the sensor section 74, or indicator means, can be collected by releasing the holding pins of elements 88 and removing the length of sensor section therebetween. An identification tag 90 may be attached, as shown attached to lower element 88, for carrying plant identification and dosimetry installation information.

Figure 7:
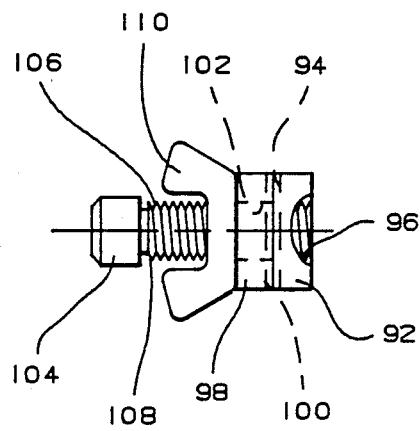
FIG. 7 is a detailed view of a chain clamp shown in FIG. 4.

FIG. 7 presents a more detailed view of chain clamp 86. It comprises a first block 92 having formed therein a pair of parallel grooves 94 having two diameters each one of which provides clearance for the chain beads and a smaller diameter one which provides clearance for the wire between the beads, and a threaded bore 96 therebetween. A second block 98 has formed therein a pair of parallel grooves 100 adapted to form with the pair of parallel grooves 94 formed in the first block 92 a pair of parallel channels, the second block 98 also including a through hole 102, a socket head cap screw 104 including a threaded shank portion 106, a spring 108 coiled about the shank portion 106, and a wing nut 110 threaded on the shank portion 106, such that the shank portion 106 is inserted through the through hole 102 into the threaded bore 96 being rigidly attached thereto, thereby forming a spring-loaded clamp adapted to restrain the loop of chain 84 within the channels.

In operation, when the operator removes the sensor set 74, as at the end of a fuel cycle, he first removes the clamp 86. Then the chain 84 is rotated so that section 74 is lowered to his reach, i.e. clockwise as illustrated in FIG. 4. The operator releases sensor section 74 at each of the stop elements 88, and the sensor set is removed and analyzed. When sensor set 74 is replaced, the same set, comprising a length of bead chain 84 and dosimeter units 76 with new sensors, is reconnected by pinning it to stops 88. The operator then rotates the sensor unit upward until upper stop 88 hits the U-tube, and locks the chain in place with clamp 86. In this manner, the sensors may be removed, new ones inserted, and the new ones returned to precisely the former sensor locations. In practicing the method of this invention, a plurality of dosimeters are thus initially placed in position; the nuclear reactor operates through a full fuel cycle; the dosimeters are removed and their information obtained; fresh dosimeters are returned to the same positions as in the prior cycle; and the cycle is then repeated.

Figure 11:
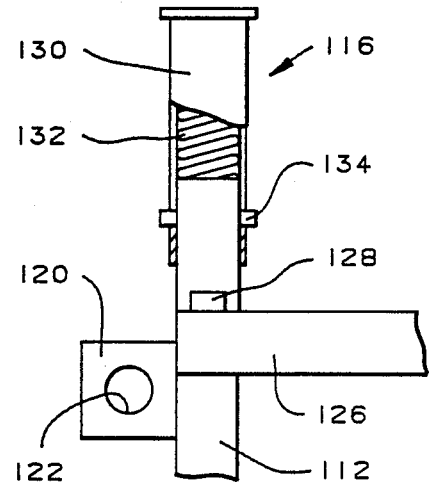
FIG. 11 is a detailed view of the spring-loaded head portion of the support stand shown in FIGS. 3 and 8.
Figure 8:
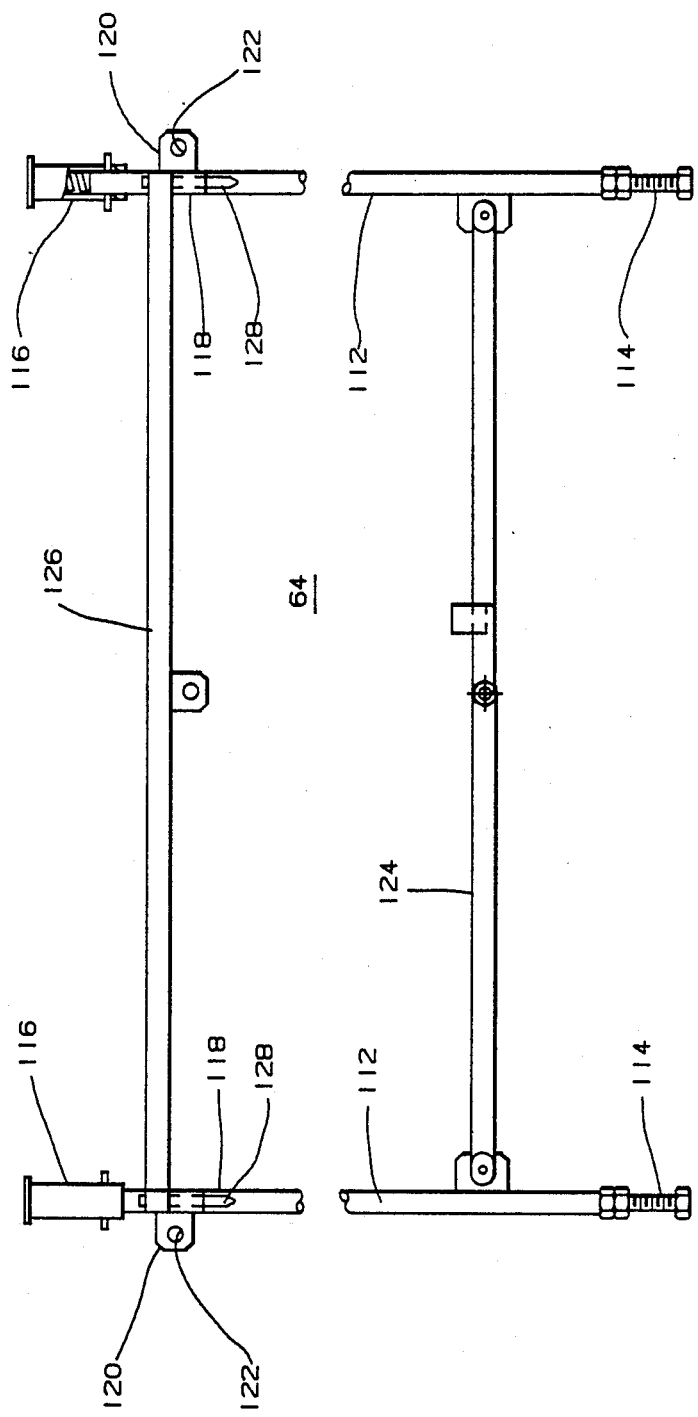
FIG. 8 illustrates the support stand shown in FIG. 3.

Referring now to FIGS. 8 and 11, the support stand 64 according to a first embodiment of the present invention can be seen to be comprised generally of a pair of support tubes 112, each of the support tubes 112 including an adjustable foot portion 114, a spring-loaded head portion 116, a sleeve portion 118, and a suspension plate 120 having a hole 122 formed therein, an articulated cross bar 124 attached between the support tubes 112, and a rigid cross bar 126 having pins 128 formed thereon at either end. Such a support stand 64 may be inserted initially within the cavity 46 in a collapsed state wherein the assembly formed by the pair of support tubes 112 an articulated cross bar 124 are in a collapsed state in which the support tubes 112 substantially contact each other. Thereafter, the assembly is permitted to open to its deployed state in which the support tubes 112 are spaced apart in a parallel relationship. The rigid cross bar 126, through its pins 128, is attached to the assembly by insertion of the pins 128 within respective sleeve portions 118.

As shown in greater detail in FIG. 11, the spring-loaded head portion 116 of the support tube 112 permits the support stand 64 to be rigidly attached beneath the seal ledge 48 and a corresponding ledge formed in the primary biological shield 50 (FIG. 3). During installation, the foot portion 114 of each support tube 112 is initially adjusted to accommodate most of the height between the seal ledge 48 and the primary biological shield 50. Thereafter, the spring-loaded head portion 116, comprised generally of a sliding tube 130 fitted over the support 112 and a spring 132 contained therein, is compressed and retained in the compressed state by the lock pin 134 resting in a cross-slot in the sliding tube. When the support stand is in place under the seal ledge, the sliding tube is released to travel under spring compression with the lock pins riding in the longitudinal slot in the sliding tube. It should be noted at this juncture that the spring-loaded head portion 116 is necessarily compressed near its lower limit in order to allow for expansion and contraction of the reactor vessel 14.

Referring now to FIGS. 9 and 10, the support bar 70 will now be explained. Hung by the chains 66 from the support stand 64 (FIG. 3), each support bar 70 is a substantially curvilinear bar having a plurality of the U-shaped tubes 72 mounted thereon. At various points along the support bar 70 are coupling holes 136 by which the bar may be connected to the chain 66 through conventional means such as a threaded chain coupler. Bars 70 may be positioned all around the vessel, or around just a portion of the 360° circumference. A unit 74 is hung from each tube 72.

In accordance with a second embodiment of the present invention, a support stand 138 adaptable for low-profile cavities is shown in FIGS. 12 and 13. The support stand 138, like the support stand 64, is intended to be deployed in a substantially upright manner, and includes a pair of support members 140, each including an adjustable foot portion 142, a pair of parallel cross members 144 attached between the support members 140 to maintain the support members 140 in a parallel spaced relationship, and a pair of arm members 146, each of the arm members 146 being pivotally coupled at one end thereof to a respective support member 140. The arm members 146 further include a cleat portion 148 upon which is attached a spring plunger 150 and a support rod 152, wherein the chain 66 suspending the support bar 70 and its associated sensor sets 74 is coupled to the support rod 152 and locked in place by the spring plunger 150.

A method, according to the present invention, of monitoring neutron exposure to the reactor vessel 14 consists generally of the steps of forming a plurality of the sensor sets 74, remotely positioning the sensor sets 74 at a plurality of preselected locations within the cavity 46, exposing the remotely positioned sensor sets 74 by operating the plant 10, remotely retrieving, upon cessation of plant operations, the exposed sensor sets 74 from the reactor sump area, conducting neutron activation analysis of the exposed sensor sets 74, and repeating each of above steps from fuel to fuel cycle. The sensor sets 74 are suspended through the U-shaped tubes 72 attached to a fixed plate 68 or support bar 70 coupled to one of the two previously recited support stands 64 or 138. Thereafter, the sensor sets 74 may be retrieved from a remote location such as beneath the reactor vessel 14, and replaced with new sensor sets 74, being accurately and repetitively positioned at the preselected heights relative to the reactor vessel 14 in order to better assess the long-term effects of neutron irradiation on properties of the reactor vessel material.

Obviously, many modifications are possible in light of the above teachings. It should, therefore, be understood that the present as defined by the appended claims may be practiced otherwise than as specifically described herein without departing from the true spirit or scope thereof.

We claim as our invention:

1. In a nuclear power plant having a reactor vessel including a wall, a core contained within the reactor vessel which includes an array of neutron-producing fuel elements adapted for cyclical replacement upon exhaustion of the fuel, ex-core detector means for measuring a neutron flux, and a primary biological shield substantially surrounding the reactor vessel thereby forming a reactor cavity between the wall and the shield, a system for monitoring neutron exposure to the reactor vessel, comprising:
   passive dosimetry means for indicating a neutron dosage accumulated over the fuel cycle at a plurality of different preselected locations within the cavity, wherein said indicating means is supplemental to the ex-core neutron detecting means; and
   means for remotely positioning said indicating means accurately and repeatedly at said same plurality of different preselected locations within the cavity.

2. The system according to claim 1, wherein said indicating means comprises a plurality of neutron sensor sets.

3. The system according to claim 2, wherein each said sensor set comprises a passive dosimeter.

4. The system according to claim 2, wherein each said sensor set comprises:
   at least one dosimeter; and
   means for housing said at least one dosimeter.

5. The system according to claim 4, wherein said housing means comprises:
   a holder plate having formed therein a plurality of cavities each of which is adapted to contain said at least one dosimeter;
   a lid plate covering said holder plate with said at least one dosimeter contained therein; and
   means for securing said lid plate to said holder plate.

6. The system according to claim 5, wherein said holder plate comprises an aluminum plate having at least one substantially cylindrical cavity of a first predetermined size and at least one other substantially cylindrical cavity of a second predetermined size, said second size smaller than said first size.

7. The system according to claim 6, wherein said first size cavity is formed to contain a cadmium-shielded dosimeter, and said second size cavity is formed to contain a bare dosimeter.

8. The system according to claim 4, wherein said at least one dosimeter is selected from the group of radiometric monitors and solid state track recorders.

9. The system according to claim 8, wherein each said radiometric monitor comprises a cadmium-shielded material selected from the group of iron, nickel, copper, niobium, titanium, silver and cobalt-aluminum.

10. The system according to claim 8, wherein each said radiometric monitor comprises a bare metal selected from the group of iron, silver and cobalt.

11. The system according to claim 8, wherein, each said solid state track recorder comprises:
   a nickel backing disc;
   a reusable deposit of a selected fissionable material on said backing disc; and
   replaceable mica in surface contact with said reusable deposit.

12. The system according to claim 11, wherein said fissionable material is selected from the group of U-235, U-238, Pu-239 and Np-239.

13. The system according to claim 12, wherein said solid state track recorder is cadmium-shielded.

14. The system according to claim 12, wherein said fissionable material is selected from the group of U-235 and Pu-239.

15. The system according to claim 14, wherein said solid state track recorder is bare.

16. The system according to claim 2, wherein said indicating means further comprises a plurality of gradient chains connecting said sensor sets, said gradient chains being adapted to react with iron, nickel and cobalt.

17. The system according to claim 16, wherein said gradient chains each comprise a predetermined length of beaded chain formed from an alloy of stainless steel.

18. The system according to claim 5, wherein said positioning means comprises a bead chain, and means for securing said housing means to said bead chain.

19. The system according to claim 1, wherein said remote positioning means comprises:
   means for locating a plurality of predetermined heights relative to the vessel; and
   means for collecting said indicating means.

20. The system according to claim 19, wherein said locating means comprises means for transferring said indicating means from said preselected locations to a collection location, said transferring means being adapted to minimize interference with a refueling operation undertaken at the end of the fuel cycle.

21. The system according to claim 20, wherein said locating means further comprises:
   a plurality of plates, each said plate being suspended within the cavity at a respective predetermined height; and means, attached to each said plate for guiding said transferring means.

22. The system according to claim 21, wherein each said plate further comprises a horizontal reference groove adapted for replacement of said plate at said predetermined height.

23. The system according to claim 21, wherein said guiding means comprises:
   a pair of brackets, each said bracket including a hole; and
   a U-shaped tube, each leg of said tube extending downwardly through and attached to a respective one of said holes.

24. The system according to claim 23, wherein said locating means further comprises:
   a length of beaded chain threaded through said tube;
   a pair of stops elements, each said end stop being attached to a respective end of said chain thereby limiting the movement of said chain through said tube between a deployed position corresponding to said predetermined heights and a collecting position adapted for retrieval of said sensors sets, wherein said end stops are further attached to said sensor sets thereby forming a continuous loop; and
   means for clamping said loop in a selected position.

25. The system according to claim 23, wherein said clamping means comprises:
   a first block having formed therein a pair of parallel grooves and threaded bore therebetween;
   a second block having formed therein a pair of parallel grooves adapted to form with the pair of parallel grooves formed in said first block a pair of parallel channels, said second block also including a through hole;
   a socket head cap screw including a threaded shank portion;
   a spring coiled about said shank portion; and
   a wing nut threaded on said shank portion, wherein said shank portion is inserted through said through hole into said threaded bore being rigidly attached thereto, thereby forming a spring-loaded clamp adapted to restrain said loop in said channels.

26. The system according to claim 24, further comprising an identification tag attached to said chain, said identification tag including information relating to the plant, the location of said sensor sets within the plant corresponding to a particular azimuth, and the date of dosimetry installation.

27. The system according to claim 21, wherein each said plate is attached to an insulating layer surrounding the reactor vessel wall within the cavity.

28. The system according to claim 21, wherein each said plate comprises a substantially curvilinear member having coupling holes bored therethrough.

29. The system according to claim 28, further comprising a support stand installed within the cavity above said predetermined heights, and a pair of chains, each said chain coupling a respective coupling hole with said support stand.

30. The system according to claim 29, wherein said support stand comprises:
   a pair of support tubes, each said support tube including an adjustable foot portion, a spring-loaded head portion, a sleeve portion, and a suspension plate having a hole formed therein;
   an articulated cross bar attached between said support tubes, said support tubes with said articulated cross bar forming an assembly having a collapsed state in which said support tubes substantially contact each other and a deployed state in which said support tubes spaced apart in a parallel relationship; and
   a rigid cross bar having pins formed thereon at either end, said pins being adapted for insertion within said sleeve portions to maintain said assembly in its deployed state.

31. The system according to claim 30, wherein said support stand comprises:
   a pair of support members, each said support member including an adjustable foot portion;
   a pair of parallel cross members attached between said support members to maintain said support members in a parallel spaced relationship; and
   a pair of arm members, each said arm member being pivotally coupled at one end thereof to a respective support member, said arm members each including a cleat portion having attached thereto a spring plunger and a support rod, wherein said chain is coupled to said support rod and locked in place by said spring plunger.

32. A method of monitoring neutron exposure to a reactor vessel in a nuclear power plant having a core contained within said vessel which includes an array of neutron-producing fuel elements adapted for cyclical replacement upon exhaustion of the fuel, and a primary biological shield substantially surrounding said vessel thereby forming a reactor cavity between said vessel and said shield, wherein the method comprises the steps of:
   (a) forming a plurality of neutron sensor sets adapted to indicate a neutron dosage accumulated over the fuel cycle;
   (b) remotely positioning said sensor sets at a plurality of preselected locations within the cavity;
   (c) exposing said remotely positioned sensor sets by operating the plant through a fuel cycle;
   (d) remotely retrieving, upon cessation of plant operations following a said fuel cycle, said exposed sensor sets;
   (e) conducting neutron activation analysis of said exposed sensor sets;
   (f) replacing a like plurality of neutron sensor sets at said plurality of preselected locations; and
   (g) again operating said plant through a fuel cycle and retrieving the exposed sensor sets for analysis.

33. The method as described in claim 32, wherein said step of remotely positioning comprises affixing said sensor sets to a chain and positioning said chain in a predetermined position within said cavity.

34. The method as described in claim 33, wherein said step of retrieving comprises moving said chain to an accessible position and removing said sensor sets from said chain.

35. A nuclear power plant dosimeter system for monitoring radiation within the cavity between the plant reactor vessel and the surrounding shield comprising,
   at least one interconnected set of radiation sensors;
   support means located at a fixed position within said cavity;
   carrying means movably connected to said support means for releasably carrying said sensor set; and
   said carrying means having position means for accurately and repeatedly positioning said carrying means with respect to said support means, whereby said sensor set can be removed and replaced after each fuel cycle operation of said plant.

36. In a nuclear power plant having a reactor vessel including a wall, a core contained within the reactor vessel which includes an array of neutron-producing fuel elements adapted for cyclical replacement upon exhaustion of the fuel, and a primary biological shield substantially surrounding the reactor vessel thereby forming a reactor cavity between the wall and the shield, a system for monitoring neutron exposure to the reactor vessel, comprising:

passive dosimetry means for indicating a neutron dosage accumulated over the fuel cycle at a plurality of different preselected locations within said cavity; and means for remotely positioning said indicating means accurately and repeatedly at said same plurality of different preselected locations within the cavity;

wherein said indicating means includes a plurality of sensor sets, each said sensor set having at least one dosimeter, and means for housing said at least one dosimeter, said housing means including a holder plate having formed therein a plurality of cavities each of which is adapted to contain said at least one dosimeter, a lid plate covering said holder plate with said at least one dosimeter contained therein, and means for securing said lid plate to said holder plate.

37. The system according to claim 36, wherein said holder plate comprises an aluminum plate having at least one substantially cylindrical cavity of a first predetermined size and at least one other substantially cylindrical cavity of a second predetermined size, said second size smaller than said first size.

38. The system according to claim 37, wherein said first size cavity is formed to contain a cadmium-shielded dosimeter, and said second size cavity is formed to contain a bare dosimeter.

39. The system according to claim 36, wherein said positioning means comprises a bead chain, and means for securing said housing means to said bead chain.

40. In a nuclear power plant having a reactor vessel including a wall, a core container within the reactor vessel which includes an array of neutron-producing fuel elements adapted for cyclical replacement upon exhaustion of the fuel, and a primary biological shield substantially surrounding the reactor vessel thereby forming a reactor cavity between the wall and the shield, a system for monitoring neutron exposure to the reactor vessel, comprising:

passive dosimetry means for indicating a neutron dosage accumulated over the fuel cycle at a plurality of different preselected locations within the cavity; and means for remotely positioning said indicating means accurately and repeatedly at said same plurality of different preselected locations within the cavity, said remote positioning means including means for locating a plurality of predetermined heights relative to the vessel, and means for collecting said indicating means;

wherein said locating means includes a plurality of plates, each said plate being suspended within the cavity at a respective predetermined height, and means, attached to each said plate for guiding said indicating means.

41. The system according to claim 40, wherein each said plate further comprises a horizontal reference groove adapted for replacement of said plate at said predetermined height.

42. The system according to claim 40, wherein said guiding means comprises:

a pair of brackets, each said bracket including a hole; and a U-shaped tube, each leg of said tube extending downwardly through and attached to a respective one of said holes.

43. The system according to claim 42, wherein said locating means further comprises:

a length of beaded chain threaded through said tube;

a pair of stops elements, each said end stop being attached to a respective end of said chain thereby limiting the movement of said chain through said tube between a deployed position corresponding to said predetermined heights and a collecting position adapted for retrieval of said sensors sets; wherein said end stops are further attached to said sensor sets thereby forming a continuous loop; and means for clamping said loop in a selected position.

44. The system according to claim 42, wherein said clamping means comprises:

a first block having formed therein a pair of parallel grooves and threaded bore therebetween;

a second block having formed therein a pair of parallel grooves adapted to form with the pair of parallel grooves formed in said first block a pair of parallel channels, said second block also including a through hole;

a socket head cap screw including a threaded shank portion;

a spring coiled about said shank portion; and a wing nut threaded on said shank portion, wherein said shank portion is inserted through said through hole into said threaded bore being rigidly attached thereto, thereby forming a spring-loaded clamp adapted to restrain said loop in said channels.

45. The system according to claim 43, further comprising an identification tag attached to said chain, said identification tag including information relating to the plant, the location of said sensor sets within the plant corresponding to a particular azimuth, and the date of dosimetry installation.

46. The system according to claim 40, wherein each said plate is attached to an insulating layer surrounding the reactor vessel wall within the cavity.

47. The system according to claim 40, wherein each said plate comprises a substantially curvilinear member having coupling holes bored therethrough.

48. The system according to claim 47, further comprising a support stand installed with the cavity above said predetermined heights, and a pair of chains, each said chain coupling a respective coupling hole with said support stand.

49. The system according to claim 48, wherein said support stand comprises:

a pair of support tubes, each said support tube including an adjustable foot portion, a spring-loaded head portion, a sleeve portion, and a suspension plate having a hole formed therein;

an articulated cross bar attached between said support tubes, said support tubes with said articulated cross bar forming an assembly having a collapsed state in which said support tubes substantially contact each other and a deployed state in which said support tubes spaced apart in a parallel relationship; and a rigid cross bar having pins formed thereon at either end, said pins being adapted for insertion within said sleeve portions to maintain said assembly in its deployed state.

50. The system according to claim 49, wherein said support stand comprises;

a pair of support members, each said support member including an adjustable foot portion;

a pair of parallel cross members attached between said support members to maintain said support members in a parallel spaced relationship; and a pair of arm members, each said arm member being pivotally coupled at one end thereof to a respective support member, said arm members each including a cleat portion having attached thereto a spring plunger and a support rod, wherein said chain is coupled to said support rod and locked in place by said spring plunger.

* * * * *